Figure 3:
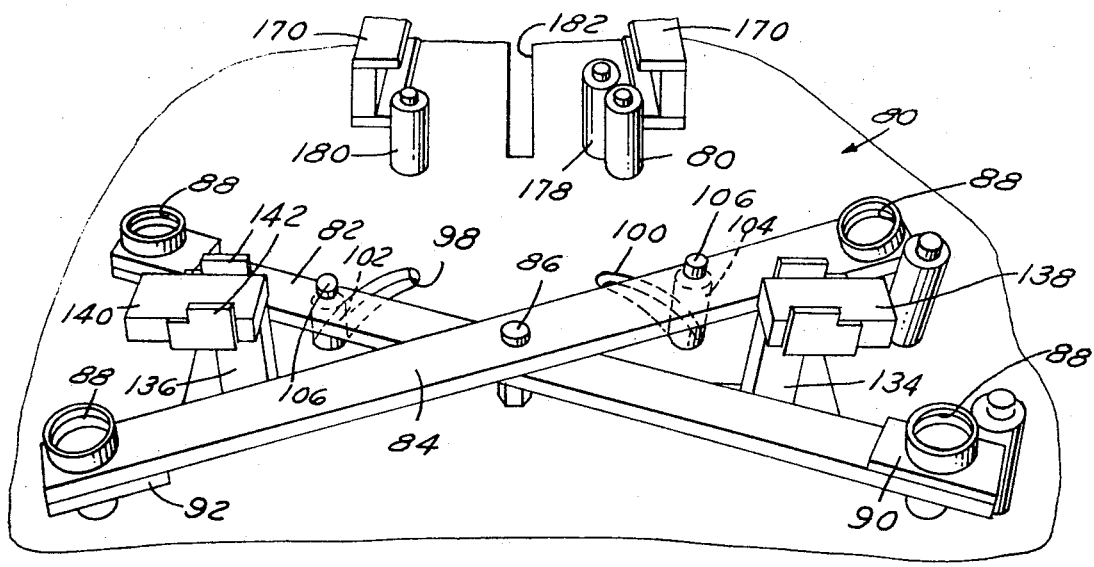

United States Patent [19]

Morgan, Sr. et al.

[11] 3,752,062

[45] Aug. 14, 1973

[54] APPARATUS FOR BONDING BRAKE LININGS

[75] Inventors: Thomas E. Morgan, Sr.; Thomas E. Morgan, Jr., both of Detroit, Mich.

[73] Assignee: Leonard Friedman, Beverly Hills, Calif.

[22] Filed: Apr. 30, 1971

[21] Appl. No.: 139,005

[52] U.S. Cl............... 100/93 PB, 269/90, 269/109, 269/218, 269/227, 269/234, 269/270, 269/321 B
[51] Int. Cl...................... B30b 15/04, B30b 15/34
[58] Field of Search................. 100/93 PB; 29/233; 156/228, 583; 269/153, 321 B, 31, 90, 107, 109, 218, 227, 234, 270

[56] References Cited
UNITED STATES PATENTS

| | | |
|---|---|---|
| 2,523,507 | 9/1950 | Langford et al. ............... 100/93 PB |
| 2,649,132 | 8/1953 | Barrett.............. 100/93 PB |
| 2,498,937 | 2/1950 | Barrett.............. 100/93 PB |
| 2,455,341 | 11/1948 | Saunders................ 100/93 PB |
| 2,377,962 | 6/1945 | Preston.............. 269/234 X |

Primary Examiner—William I. Price
Assistant Examiner—Alan I. Cantor
Attorney—Barnes, Kisselle, Raisch & Choate

[57] ABSTRACT

Apparatus for bonding brake blocks to brake shoes, particularly of the type used for large commercial vehicles or military vehicles. A pressure cage utilizes opposed pressure blocks with an apparatus for applying initial pressure in the spreader assembly and opening and closing the pressure assembly to facilitate the insertion of the relatively heavy parts. The apparatus includes automatic equipment for opening and closing the pressure cage as well as applying the pressure for the assembly and subsequent releasing.

21 Claims, 9 Drawing Figures

INVENTORS
THOMAS E. MORGAN, SR.
THOMAS E. MORGAN, JR.
BY
Barnes, Kisselle, Raisch & Choate
ATTORNEYS

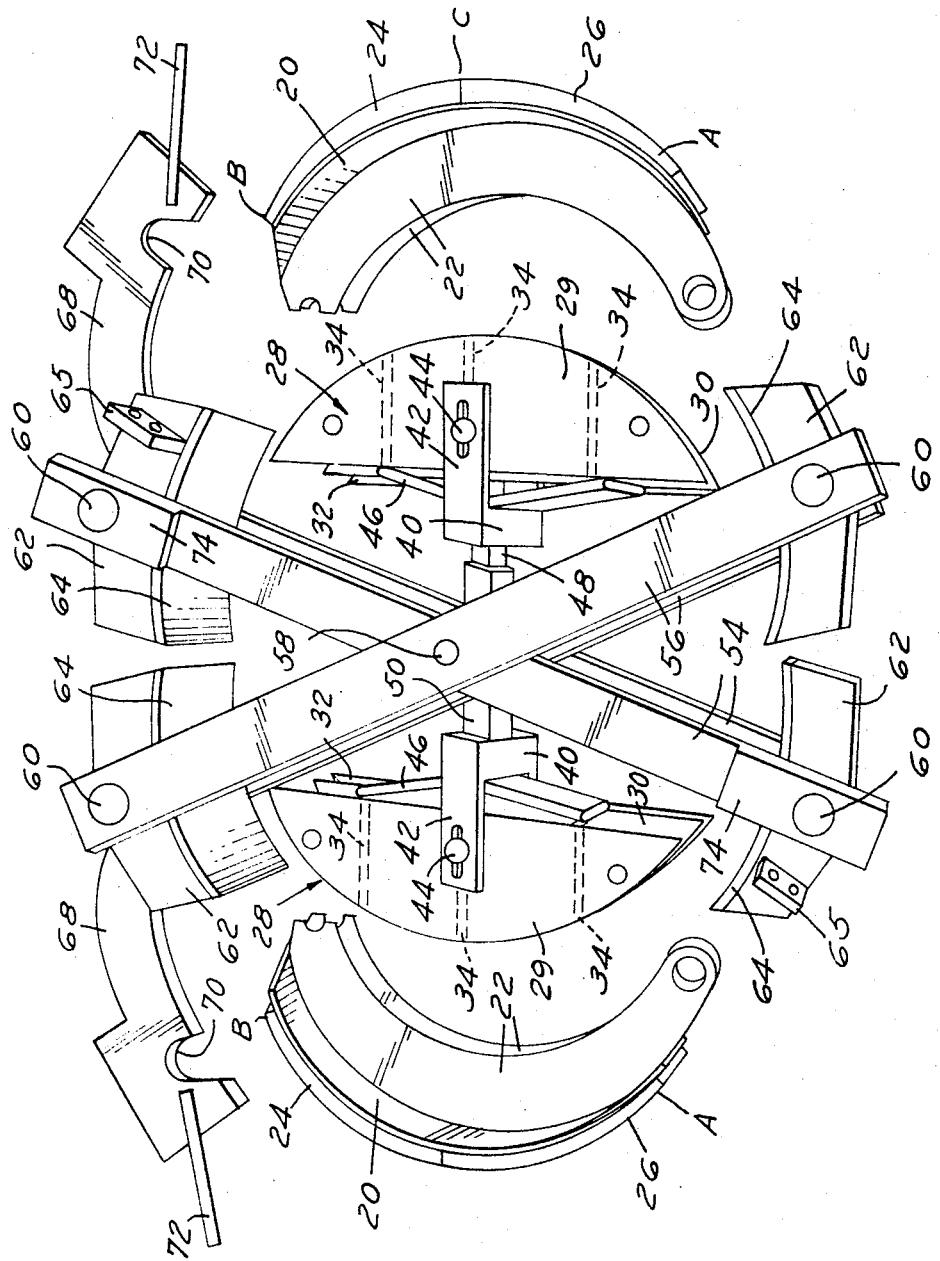

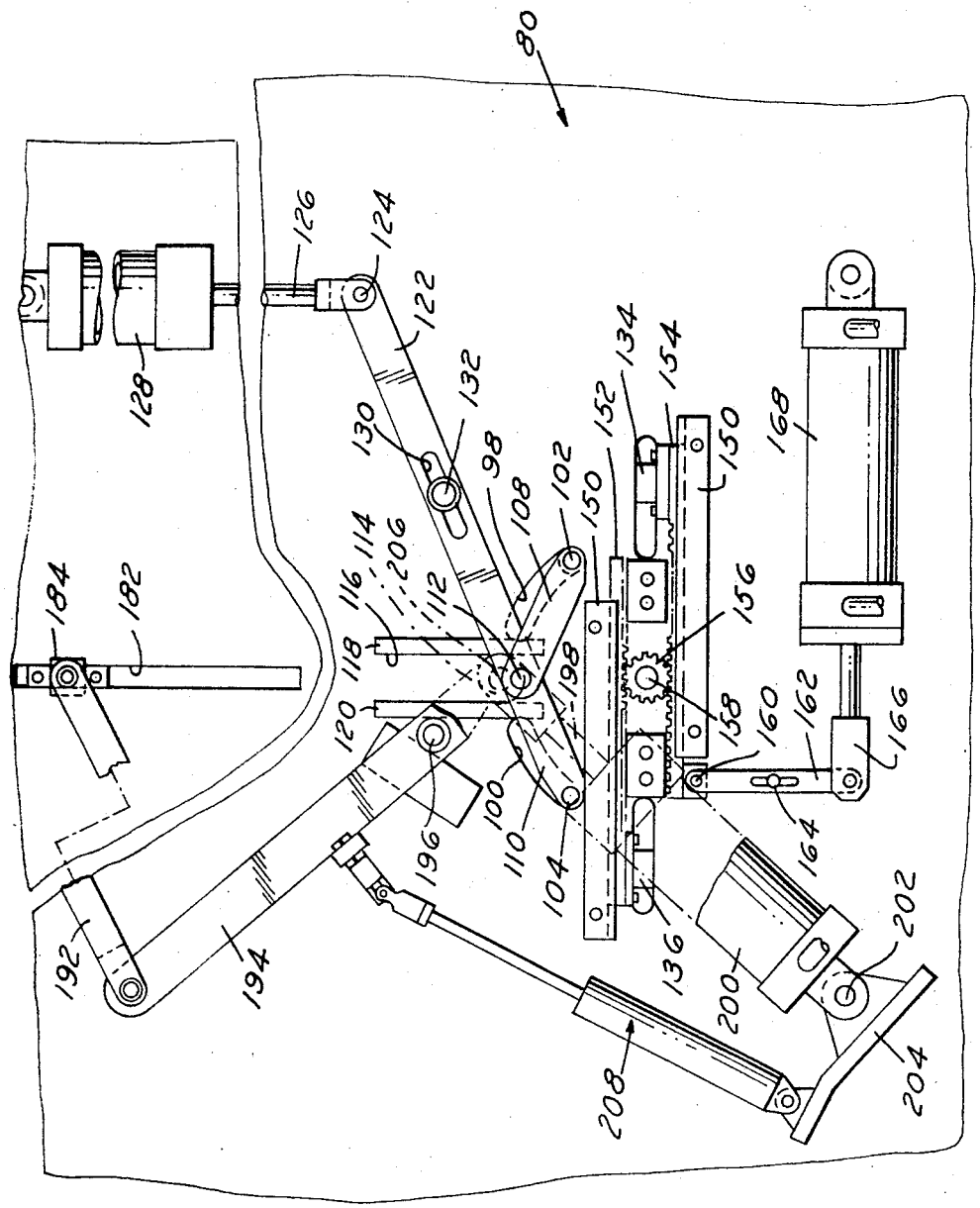

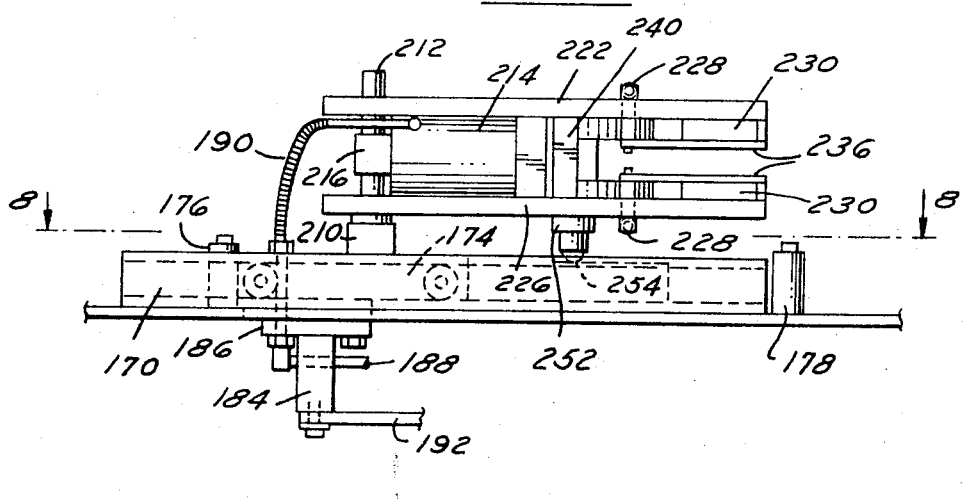
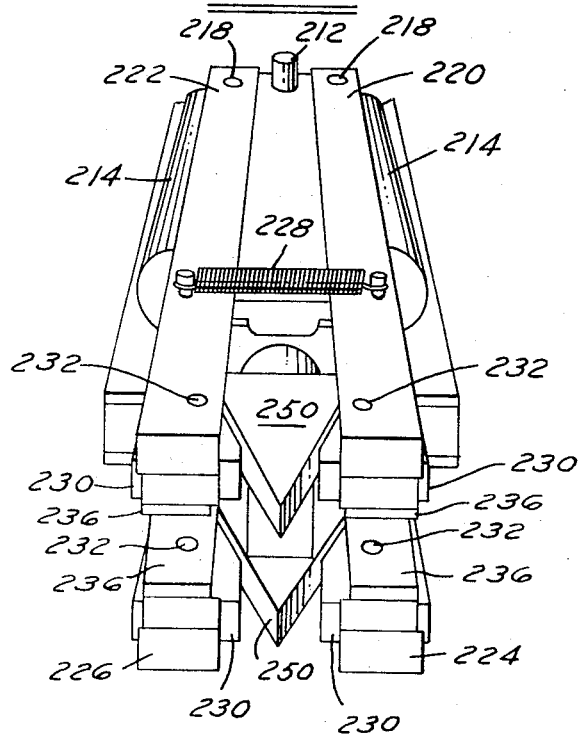

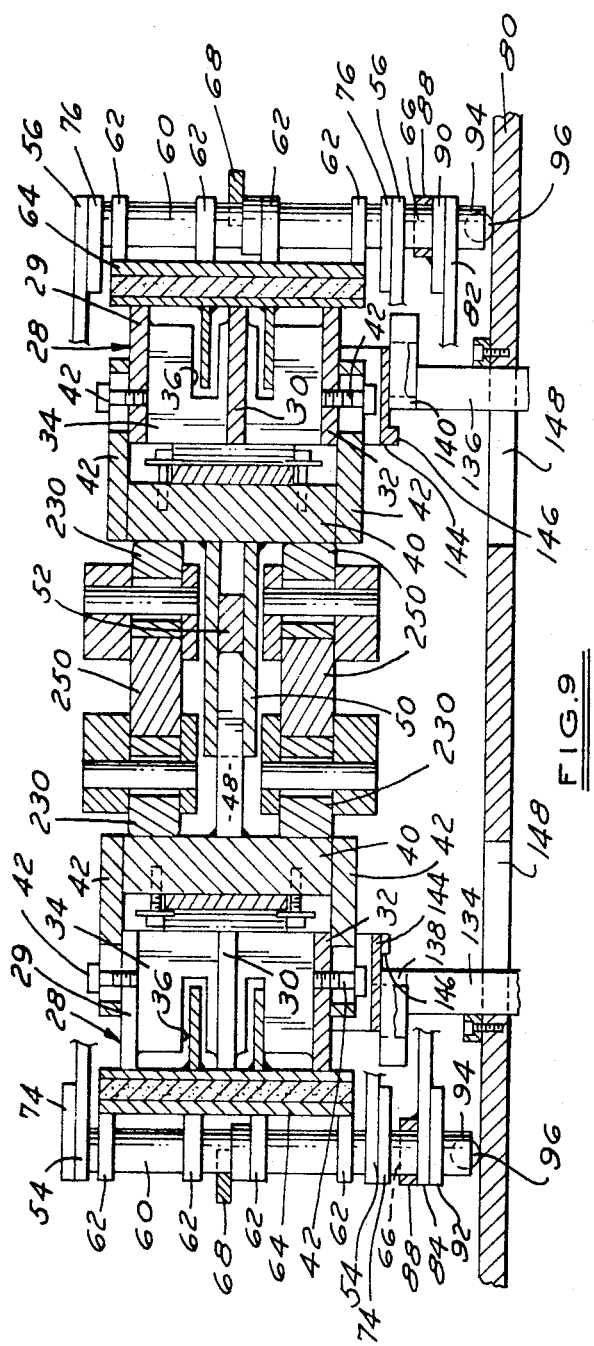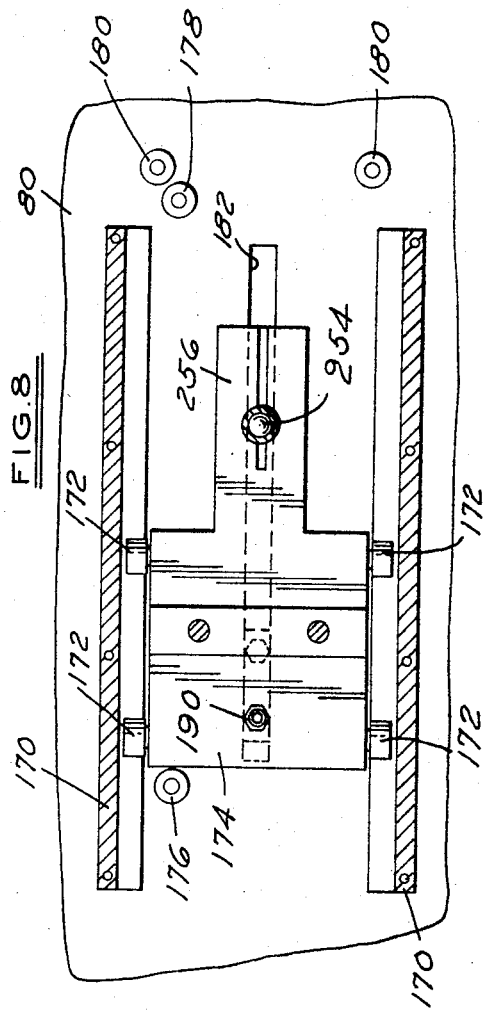

APPARATUS FOR BONDING BRAKE LININGS

Reference is made to our copending application, Ser. No. 888,650, filed Dec. 29, 1969, now U.S. Pat. No. 3,638,560.

This invention relates to an Apparatus for Bonding Brake Linings.

In the history of the art, many brake blocks, sometimes referred to as brake linings, have been riveted to the lining table of the brake shoe which is mounted on a web or strut within the brake drum of a wheel. It has been known also to utilize a bonding material for creating the adhesion between the brake lining and the brake shoe table. This bonding is accomplished by putting a metal band tightly around the brake shoes with the brake block or lining suitably positioned with an adhesive applied to the contacting surfaces. While under pressure, the parts are heated to obtain the proper bond.

With brake linings for passenger cars which are reasonably flexible and which in general have a uniform thickness from end to end, this system has been satisfactory. However, with larger brake units especially those used for trucks, buses and the like, the brake blocks have a much greater thickness and in addition in many cases this thickness varies intentionally from one section to the other, the thick portion being centrally of the shoes and the dimension tapering off at the ends of the shoes.

The thickness and character of these brake blocks is such that they are quite rigid and it has been difficult to bond these blocks satisfactorily. On the other hand, riveted brake blocks for trucks have had many disadvantages. Trucks very frequently have to operate in conditions where the entire brake assembly is exposed to water, and rusting of the parts has occurred between the brake block and the brake shoe lining table in such a way as to force the block away from the shoe. This may also happen only on one side of the brake shoe which of course immediately creates an uneven pressure across the shoe, thus reducing the braking surface and effectiveness. In addition, the rivet wells will frequently accumulate abrasive material particularly in trucks carrying gravel, dirt, slag, and the like and this abrasive material will tend to score the brake drums. Also, when the riveted brake shoes wear down, the rivets themselves will tend to score the drums, all of this being an unsatisfactory condition.

It is an object of the present invention to disclose a method and apparatus for bonding the heavy brake shoes which are used on large commercial and military vehicles. This bonding has been accomplished by utilizing a much greater pressure than has ever been used before in the bonding field for brake shoes, and the present invention has as its object the provision of a method and apparatus whereby it is possible to obtain a constant pressure around the band during the heating step to insure a large and consistent area of bond. With the higher pressures, it has been necessary also to avoid the distortion and flattening of the brake shoe tables, that is, the plate on which the shoe is bonded and it is an object of the present invention to accomplish this bonding without destructive distortion. Thus, the bonded shoe avoids the problems of rust since there is no gap between the brake shoe and the supporting table. It avoids the problems of the rivet wells in the brake material itself; it accommodates the brake shoe to the table to compensate for any cupping or irregularities in the surfaces and the bonding actually strengthens the brake shoe table because of the overall contact and adherence of the heavy brake shoe material to the supporting plate, thus achieving what may be called lamination strength.

One of the problems in connection with bonded brake blocks with encircling bands has been to create enough pressure to obtain a full surface contact during the bonding action.

Another problem has been that the encircling bands tend to stretch and this stretching is not always equal throughout the width or circumference so that irregularities develop as the band is used.

A third problem is that it has been difficult to accommodate the ends of the brake shoes with the use of encircling bands and the apertures or other devices needed for solving this problem have had disadvantages in that they created localized stretching or uneven pressures.

The present invention contemplates an apparatus for locking up brake bands and brake blocks for heat cycling to create the permanent bonding. The encircling band has been eliminated and a new scissors type apparatus in the form of a pressure cage has been developed with pressure plates diametrically opposed and associated in such a way that an extremely high pressure can be exerted between the brake table and the brake blocks that are to be applied and bonded.

Another feature of the invention is the use of an apparatus for manipulating the pressure devices and the pressure cage to the extent that most of the heavy movement is accomplished by power devices which can relieve the operator from much of the straining work that would otherwise be necessary.

A further object is the provision of mechanized apparatus in combination with the pressure cage for locking up block linings preparatory to heat cycling.

Other objects and features of the invention will be apparent in the following description and claims taken with the drawing wherein there is set forth a preferred embodiment of the invention illustrating the principles of operation and the manner of use.

Figure 1:
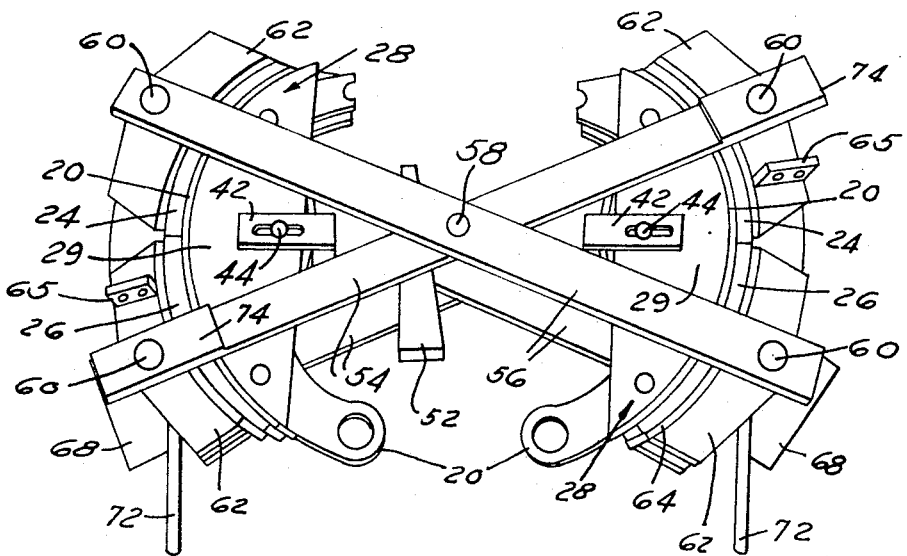

Drawings accompany the disclosure and the various views thereof may be briefly described as:

FIG. 1, a view of a pressure cage in assembled condition.

FIG. 2, a view of the pressure cage and the respective parts in desired assembly.

FIG. 3, a view of a portion of an operating mechanism for moving the parts of the pressure cage.

Figure 4:
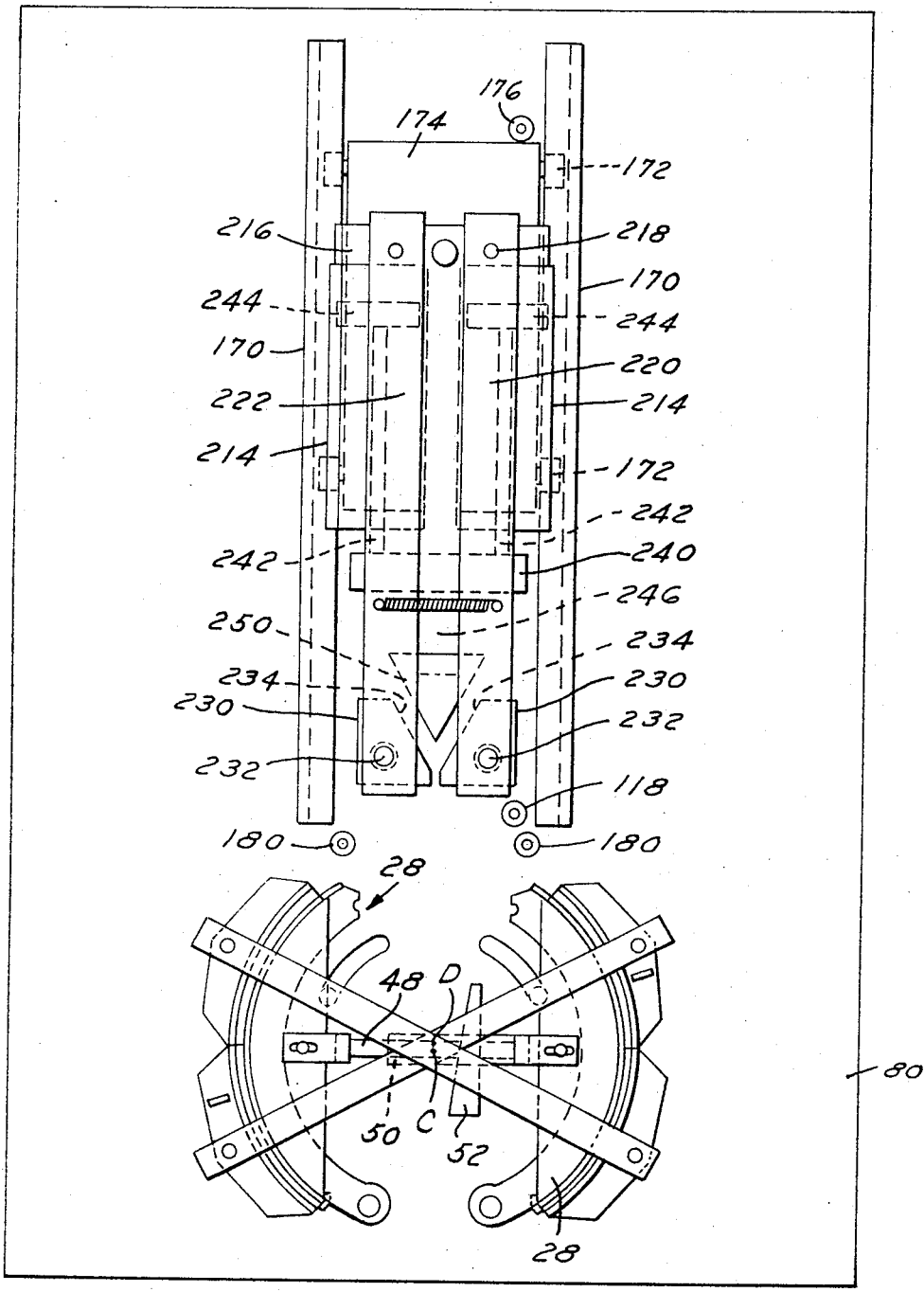

FIG. 4, a view of the top of a machine for manipulating the device.

FIG. 5, a bottom view of the mechanism of the machine showing the power components.

FIG. 6, a side view of a spreader component.

FIG. 7, a perspective view of the spreader component.

FIG. 8, a sectional view on line 8—8 of FIG. 6.

FIG. 9, a sectional view of the fully assembled pressure cage showing the manner in which the spreader device is associated with the lock-up assembly in the pressure phase.

Referring, first of all, to FIGS. 1 and 2, the lock-up assembly or pressure cage for the device is illustrated. Reference is first made to what is generally called a brake shoe. This consists of a table 20 having the proper curvature and width, this table having attached thereto, two arcuate mounting plates 22 which are securely welded to the back of the brake table. The brake blocks, which are the wear parts of the brake, are shown at 24 and 26. These have a varying thickness which is substantially equal at the center portion C but is thinner at one end A than at the other end B. It will be appreciated that the brake blocks 24–26 are applied to the tables 20 by an adhesive which is heat cycled for permanent bonding. After the wear blocks are applied to the brake shoe table, the composite assembly is applied to the clamping assembly.

The supporting anvil designated generally at 28 for each shoe consists of spaced arcuate or chordal plates 29, 30 and 32 (See FIG. 9) which are joined together by cross plates 34 welded between the arcuate plates at right angles thereto. These plates 34 can be possibly three in number for each anvil, two of them diametrically opposed as the anvils are assembled, and the others spaced outwardly toward the ends of the anvil 28 formed by the chordal plates. This supporting anvil 28, which may also be referred to as an internal compression spreader, can be made as a weldment or as a unitary casting of, for example, 1045 steel. The curve of the chordal plates, of course, is made to match the inside surface of the brake tables 20. The cross plates 34 are slotted at 36 (FIG. 9) to receive the brake shoe elements 22. The respective right and left assemblies of the chordal plates, as viewed in FIG. 2, are captive on U-shaped bars having a pressure base 40 with upper and lower arms 42, these arms being slotted to receive a retaining bolt 44 which allows relative movement with the chordal plates. Backed against the inside of the cross bar 40 is a heavy spring member 46, the ends of which curve outwardly to bear against the chordal assembly 28. The right-hand element 40, as viewed in FIG. 2, has a projection tongue or bar 48 which inserts into a hollow projecting housing 50 extending from the left-hand bar 40. The hollow housing 50 has opposed openings, one edge of which is adjacent the end of the projection 48 so that a wedge 52 can project through the housing and bear against the end of the projection 48 as shown in FIG. 9. It will be seen that the further the chordal assemblies 28 are separated, the further in the wedge can be driven but the wedge will maintain the applied pressure until released.

The pressure cage assembly shown in FIGS. 1 and 2 consists of top and bottom pairs of cross bars 54 and 56 which are pivoted centrally at 58. Each pair of bars has a pin 60 at each end transfixing the bars and passing through spaced lug plates 62 (FIG. 9) on which is fastened a curved bearing plate 64. Two lift lugs 65 are provided on opposed lug plates 62 to permit lifting of the assembly by a hoist at the proper time. It will be seen in FIG. 9 that the pins 60 project downwardly below the lower cross plates 54–56 in an end portion 66 which cooperates with a socket member later to be described.

As the parts are viewed in FIG. 2, they are ready for assembly. The brake shoes and blocks are to be moved inwardly toward the center and then the parts 54–56 are to be pivoted relative to each other so that each take the position shown in FIG. 1 where the plates 64 overlie respectively the brake blocks 24 and 26 on each side of the assembly. The parts thus form a cage for a pair of brake shoe assemblies and are held in this position by a latch mechanism 68 pivoted on one of the pins 60 and having a notch 70 which will lock over one of the other pins 60 when the parts are closed together. A small handle 72 is utilized to manipulate the device.

As shown in FIG. 2, it will be seen that the top bar 54 has a small end plate 74 welded to it, also penetrated by the pin 60; and as illustrated in FIG. 9, the bar 56 has a plate 76 on its lower surface transfixed by the pins 60. The same construction is found at the bottom of the unit. The lug plates 62 have a pivotal relationship with the pins 60 so that they may swing relative thereto to take a proper position in assembly. The assembly or pressure cage shown in FIG. 1 is actually assembled on a handling device in the form of a machine shown in FIGS. 3 to 9.

The top plate of the machine is shown at 80. It has two cross bars 82, 84 pivoted on the top of the machine at 86. Each cross bar has a cup-like socket 88 at each end which will cooperate with the projection 66 previously described and as shown in FIG. 9. The lower cross bar 82 has reinforcement end plates 90 on its top surface and the upper cross bar 84 has the same plate 92 on its lower end surface. Directly below each of the sockets 88 is a caster element 94 with a roller 96 which permits the outer ends of the cross bars 82–84 to ride easily in a scissors motion on the top plate 80. It will be noted that this top plate has arcuate slots 98–100 through which project posts 102 and 104 having pins 106 which project through the respective arms 82–84. These posts are actuated from below plate 80 in a manner to permit the opening and closing of the cross bars 82–84 to facilitate the assembly of the device.

If reference is made to FIG. 5, which is a view from the bottom of the plate 80, it will be seen that the posts 102–104, which extend down through the curved slots 100 and 98, are actuated by links 108 and 110. These links each have one end pivoted at a common pin 112 which carries a roller 114 operating in a track 116 formed by plates 118 and 120 welded to the bottom of plate 80. A lever 122 is also pivoted to the pin 112 at one end and connected at the other end at 124 to a piston rod 126 extending from a fluid pressure cylinder 128. The lever 122 has a slot 130 and is pivoted at a fulcrum bolt 132 anchored in the plate 80. Thus, projection of the piston rod 126 will cause lever 122 to pivot around the bolt 132 carrying the roller 114 and the pin 112 back in the slot 116 retracting the links 108 and 110 and the posts 102 and 104. This will change the position of the bars 82 and 84 on the top of the plate.

As shown in FIGS. 3 and 9, rising through the plate 80 are vertical bars 134 and 136 carrying locator platforms 138 and 140. These platforms have side lugs 142 which form a channel which locates the bottom arm 42 on the U-assembly 40–42 on each side of the spreader assembly. These bottom members 42 are each provided with a small support cage 144 having a forward lug 146. This support cage fits between the side lugs 142 to locate the general assembly frames 28 as they are mounted on the unit. The vertical bars 134–136 can be actuated in and out toward and away from center in slots 148 in plate 80 by a gear and rack assembly mounted on the bottom surface of plate 80 and illustrated in FIG. 5. This assembly consists of two spaced tracks 150 in each of which is mounted a slide rack 152 and 154. Between the racks is a spur gear 156 mounted to rotate on a pin 158. On rack 154 there is pivotally mounted at 160 a lever 162 having a slot in which is located a fulcrum pivot 164. The other end of the lever is pivotally connected to a piston rod 166 actuated by a cylinder 168. Thus, when the spreader elements 28 and the respective U-shaped elements 40 are assembled onto the machine, they will be supported by the small platforms 138–140 which will locate them in the proper position relative to the front of the machine and actuation of the piston in the cylinder 168 will move these platform elements 138–140 toward the center of the machine, bringing the spreader elements together by reason of the contact of the platforms 138–140 against the lugs 146 shown in FIG. 9. In this phase of the assembly, the projection tongue 48 is inserted into the hollow housing 50. The piston-cylinder assembly 168 will also be cycled in such a way that there will be a release of pressure prior to a subsequent expansion function which will be described later.

With the assembly shown in FIG. 1 properly mounted on the assembly shown in FIG. 3, it is now possible to bring in a spreader assembly which will put pressure on the entire pressure cage structure placing the cross members 54–56 in tension and bringing the pressure plate 64 firmly to bear on the split brake blocks 24–26 against the anvil assemblies 28, which are joined, it will be recalled, by the sliding fit between the tongue 48 and the square tube 50.

The spreader assembly is shown especially in FIGS. 4, 6, 7, and 8. In these figures, there are shown two spaced parallel tracks 170 which have a confining channel which carries rollers 172 rotatably mounted on a carriage 174 which can slide back and forth in these tracks. A bumper element 176 is provided at the rear of the travel and the bumper element 178 is provided at the forward end of the travel. Two additional bumper elements 180 are provided to serve as limit stops for the arms 82–84. The carriage 174 is mounted over a slot 182 in plate 80 and on the bottom of the carriage is a drive post 184 anchored in a plate 186 which also carries a hydraulic connection 188 leading to a flexible line 190 passing up through the carriage. On the bottom of the post 184 is pivotally anchored a link 192 which is connected at its other end to a lever arm 194 fulcrummed at a post 196 extending from top plate 80 and actuated by a piston rod 198 connected to a piston in a cylinder 200 pivotally anchored at 202 on a plate 204 welded to the bottom of plate 80.

The piston rod is suitably connected by a pivotal connection at 206 to the short end of the lever 194. Also mounted between the plate 204 and the lever 194 is a shock absorber unit 208 to control deceleration of the spreader assembly at the ends of its stroke. Movement of the piston rod 198 out of the cylinder 200 will swing the lever 194 about the pivot 196 to pull the link 192 forward and thus move the carriage 174 forward in the tracks 170. On the carriage 174 is a pivot block 210 solidly mounted on the carriagge and carrying a pivot post 212 extending upwardly on which is mounted one end of a double cylinder assembly 214 composed of two parallel cylinders having a pivotal connection in a heavy lug 216 at the rear. These cylinders are fed with pressure fluid through the flexible pipe 190.

The heavy lug 216 extends transversely across the tracks 170 and pivoted on each side at 218, top and bottom, of this unit are bar elements 220, 222 on the top and 224, 226 on the bottom. The forward end of these bars are tied together by a tension spring 228 anchored in each of the bars, top and bottom respectively. Below each forward end of the top bars 220 and 222 and above each forward end of the bottom bars 224 and 226 are pivotally mounted angle blocks 230, these being pivoted at 232 and having an angle face 234. Retaining plates 236 mounted on spacers assist to mount these angle plates on the pivot posts 232, the pivot plates being captive between the bars and the retaining plates. It will thus be seen that the assembly of the bars 220, 222 and 224, 226 is such that the bars may pivot outwardly around the pivot points 218, this pivoting being resisted by the springs 228.

Mounted in front of the double cylinder system 214 is a yoke bar 240 fastened to piston rods 242 extending from pistons 244 in the dual cylinders 214. On this yoke is a forward projecting stud 246 carrying a wedge 250. This assembly is duplicated, top and bottom, between the bars of each upper and lower pair. The yoke bar 240 also has a support post 252 carrying a ball caster element 254 which operates along a forward extension 256 of the carriage 174. Thus, pressure in the cylinders 214 will project the wedge elements 250 which fit between the angle blocks 230 and this projection will spread the bars and the angle blocks outwardly.

The forward end of this assembly is intended to be inserted into the previously described pressure cage assembly by reason of the action of the link 192 and the piston 200 acting through the lever 194. Thus, the entire assembly will be projected forwardly until the carriage 174 hits the bumper stop 178. At this stage pressure fluid is directed to the dual cylinder 214 and the wedges 250 start to move forward. These various parts can be viewed in cross section in FIG. 9 where it will be seen that the angle blocks 230 have been inserted into the space between the elements 40 of the U-shaped assembly. This projection is accomplished by the movement of the carriage 174. The upper and lower wedge assemblies are spaced vertically to accommodate the elements 48–50. Then the operation of the dual piston yoke, moving the wedges 250 forward, will move the angle blocks 230 outwardly and create extremely high pressure against the pressure bars 40, this being exerted on the spring elements 46 and against the anvil assemblies 28, and by reason of the restraining force of the cross bars 54 and 56 and the plates 64 create extremely high pressure between the brake blocks 24–26 and the brake tables 20.

The above-described apparatus permits the application of 215,000 pounds to these elements through the dual cylinder and the wedge system and the pressure can be maintained in a much more uniform manner with the cage assembly avoiding end crushing which has previously resulted from the encircling bands. Once the pressure is properly applied, as above described, the wedge 52 can be driven into the opening in the square tube 50 against the end of the tongue insert 48. This locks the parts in the expanded "under pressure" condition in the pressure cage. The wedge unit can then be retracted by reverse action of the pistons 214 and the piston 200, and the cage assembly can be then lifted by a power hoist using the lift lugs 65 and transferred to a heating furnace where the proper heat is applied to the bonding material to bond the brake blocks onto the brake tables. The above-mentioned pressure is exemplary and results in pressures in excess of 2,000 pounds per square inch in the area being bonded. The high pressure also serves to drive the bonding material into the brake lining to get a deep penetration and insures a proper mating, that is, full contact, between the brake shoe table and the lining.

After a pressure assembly has been cycled in the suitable heating chamber, it can be again replaced on the machine and the spreader assembly projected to again exert an opening pressure at which time the wedge 52 can be removed, the cross bars 54–56 swung out of position by actuation of the cylinder 168 and the support bars 82–84 permitting the brake shoes to be removed from the anvils. Another assembly can then be established and the process repeated.

It will be noted that the center C of the cross arms 82–84, as pivoted on the top plate 80, FIG. 4, for example, will be off-set from the center D of the outer surfaces of the brake blocks because of the varying and tapering thickness of the brake blocks. The pressure cage, that is, the anvil blocks 28 which serve as the internal spreader units, are designed to compensate for this off-set which may vary from one-sixteenth to one-eighth of an inch or more. When the brake linings are of uniform thickness, this alteration of the spreader units is not required since the centers will be coincident.

In order to clarify the operation of the apparatus, the sequence of operation will be reviewed here. A cage assembly, which has previously been loaded and processed through the heating furnace, is lowered onto the table 80 in such a way that it is assembled onto the arms 82–84 with proper engagement with the sockets 88. The spreader unit is then advanced by motion of the carriage 174 actuated by piston 200 to move the bars 170 into the cage unit. Once this is accomplished, the spreader unit wedges 250 are advanced by the piston-cylinder combination 214 to put a spreading pressure on the assembled anvils. This then permits the manual removal of the wedge pin 52.

Next, the pressure is released from the spreader unit and the carriage 174 is retracted. Now the cylinder 168 is activated to move the platforms 138 inwardly. These platforms will contact the lugs 146 on the carriage 144 and bring the anvils inwardly away from the pressure plates 64. Then the platforms 138 are moved outwardly again and cylinder 128 is actuated to open up the arms 82–84 to permit the removal of the bonded shoes and replacement with new brake shoe tables and the unbonded shoes which are fastened thereon in circumferential juxtaposition. The arms 82–84 are then moved to the closed position again bringing the pressure pads 64 into the pressure positions and the spreader unit is again advanced and actuated to put pressure on the anvils against the pressure plates, this being resisted by the tension of the criss-cross arms 54–56. When the desired pressure is applied, the wedge 52 is again inserted to maintain the pressure after which the spreader unit is retracted and the new assembly can be hoisted away to be conveyed into the bonding furnace. This sequence is repeated for each assembly.

We claim:

1. In an apparatus for heat bonding brake blocks to brake shoe tables which includes:
   1. a pair of opposed anvils for supporting a pair of brake shoes around an assumed center, and
   2. means extending between said anvils to regulate the distance between said anvils, that improvement which comprises:
   a. means to restrain the outward movement of said anvils comprising a pair of tension bars connected centrally in criss-cross relationship for a scissors movement relative to each other, and
   b. spaced pressure plates on each bar positioned to complement and bear against a surface of a brake block on opposite brake shoes carried on said anvils.

2. An apparatus as defined in claim 1 in which each of said tension bars of said pair comprises spaced parallel bars pivotally connected to said pressure plates which extend between the spaced bars, and spaced to pivot to open and closed positions above and below said anvils, said bars in open position permitting insertion and removal of brake shoes with attached brake blocks.

3. An apparatus as defined in claim 2 in which said spaced bars are connected at each end by rods, and said pressure plates comprise curved plates shaped on one face to complement the outside of brake blocks, and lugs on said plates extending away from the said shaped faces transfixed by said rods wherein said plates may pivot on said rods.

4. An apparatus as defined in claim 3 in which locking means pivoted on one of said rods is engageable in a locking relationship with another of said rods when in closed position.

5. An apparatus as defined in claim 1 in which said means extending between said anvils comprises a telescoping tongue member and housing member, one on each anvil on a diametrical axis, said housing being apertured transversely of said axis to receive a wedge to bear against the said tongue in any of various positions of adjustment.

6. An apparatus as defined in claim 1 which includes actuator means to engage and move said tension bars in a scissors movement to an open position for assembly of brake shoes and anvils and to a closed position for pressure application.

7. An apparatus as defined in claim 6 in which said actuator means comprises a support, a pair of arms mounted in criss-cross relationship on said support, power actuated means on said support for moving said arms to each of two open and closed extreme positions, and means on said arms and on said bars engageable to effect mutuality of motion of said arms and said bars.

8. An apparatus as defined in claim 7 in which said power actuated means comprises a power piston-cylinder on said support, a pair of converging track slots cut in a support plate on said support, actuator posts extending upwardly through said slots, one to each of said arms, two links each connected at one end to one of said posts, and means connecting the other ends of said links together and to said piston-cylinder wherein actuation of said piston-cylinder will simultaneously shift said links and said posts to actuate said arms to open and closed positions.

9. An apparatus as defined in claim 7 in which locator means is provided adjacent said actuator means to locate and support said respective opposed anvils, said locator means comprising platforms adjacent said arms between opposite ends thereof, means on said support for movably mounting said platforms to and from the center of rotation of said arms, and means on said platforms and on said anvils mutually engageable to locate said anvils relative to said arms and to allow said platforms to move said anvils toward said center.

10. An apparatus as defined in claim 9 in which the means for movably mounting said platforms comprises a pair of spaced parallel tracks mounted on the bottom of a top support plate of said support below said crisscross arms, a slot in said support plate between said tracks, gear racks in each of said tracks, a post extending upwardly through each of said slots, means fastening said locator means on said posts, gear means mounted rotatably to engage each said racks, and power means to actuate one of said racks in one of said tracks wherein the other of said racks is driven in an opposite direction by said gear.

11. An apparatus as defined in claim 1 which includes spreader means to move said anvils outwardly into a pressure relationship with said pressure plates comprising a support, bar means on said support projectible into space between said anvils when assembled on said support, and means to spread said bar means outwardly against said anvils to exert pressure between brake blocks and brake shoe tables confined by said pressure plates on said anvils.

12. An apparatus as defined in claim 11 in which said anvils each have a pressure block associated therewith to receive spreading pressures, said bar means comprising top and bottom pairs of bars movably mounted at one end on said support, the other free ends being movable to a position overlying said pressure blocks, and wedge means between the bars of each pair movable to spread said bars apart to spread said pressure blocks and said anvils.

13. An apparatus as defined in claim 12 in which a piston-cylinder assembly is carried between said bar means, and means connecting a projectible piston rod from said assembly to said wedge means.

14. An apparatus as defined in claim 12 in which a pivoted angle plate is mounted on each of said bars adjacent the free ends, each having an inner angled side disposed adjacent said wedge to receive wedging pressure from said wedge as it projects relative to said bars, the outer sides of said angle plates being disposed to contact said pressure blocks.

15. An apparatus as defined in claim 12 in which a leaf spring is interposed between each said pressure block and a respective anvil, the block bearing on the center portion of the spring and the ends of the spring bearing on said anvil at each side of said block.

16. An apparatus as defined in claim 12 in which each said pressure block is held captive on each said anvil by leg members extending from said block to said anvil, slots formed in said leg members, and holding means in said anvils extending through said slots.

17. An apparatus as defined in claim 12 in which a carriage is movably mounted on said support, means to project said carriage toward assembled anvils on said support, and means to mount said movably mounted ends of said bars on said carriage.

18. An apparatus as defined in claim 17 in which track means are located on said support extending toward an assembled anvil on said support, and said carriage means is lidably supported in said track means.

19. In an apparatus for heat bonding brake block linings to brake shoe tables which includes an anvil for supporting brake shoes with assembled brake block linings, that improvement which comprises:
  a. a pair of rigid pressure plates to lie in circumferential juxtaposition and having preformed curved surfaces lying over and complemental to the curved brake block linings when positioned on a curved brake table to which bonding is to take place,
  b. means to restrain the outward movement of said blocks comprising rigid tension bars to exert inward radial force on said pressure plates against said anvils, and
  c. means to retain said bars under tension to hold said pressure plates in position against said brake block linings while positioned on said brake shoe tables.

20. In an apparatus for heat bonding brake block linings to brake shoe tables which includes:
  1. a pair of opposed anvils for supporting a pair of curved brake shoes with assembled brake block linings around an assumed center, and
  2. means extending between said anvils to regulate the distance between said anvils, that improvement which comprises:
    a. a pair of rigid pressure plates to lie in circumferential juxtaposition and having preformed curved surfaces lying over and complemental to the curved brake block linings at each anvil when positioned on a curved brake table to which bonding is to take place, and
    b. rigid bars extending between, and in pivotal relation to, said pressure plates to restrain the outward movement of said plates and block linings from said center when outward pressure is applied to said anvils.

21. In an apparatus for heat bonding brake block linings to brake shoe tables which includes:
  1. a pair of opposed anvils for supporting a pair of curved brake shoes with assembled brake block linings around an assumed center, and
  2. means extending between said anvils to regulate the distance between said anvils, that improvement which comprises:
    a. a pair of rigid pressure plates to lie in circumferential juxtaposition over the curved brake block linings at each anvil when positioned on a curved brake table to which bonding is to take place, and
    b. means extending between, and in pivotal relation to, said pressure plates to restrain the outward movement of said plates and block linings from said center when outward pressure is applied to said anvils, said means extending between said pressure plates comprising pairs of upper and lower tension bars crossed at about said assumed center, each having an end pivoted to one pressure plate of said opposed pairs.

* * * * *